United States Patent [19]

Bernasconi

[11] 4,274,755
[45] Jun. 23, 1981

[54] RIGID COUPLING, ESPECIALLY FOR TURBOGENERATORS

[75] Inventor: Felix R. Bernasconi, Zollikerberg, Switzerland

[73] Assignee: BBC Brown Boveri & Company Limited, Baden, Switzerland

[21] Appl. No.: 34,497

[22] Filed: Apr. 30, 1979

[30] Foreign Application Priority Data

Jun. 30, 1978 [CH] Switzerland .................. 7147/78

[51] Int. Cl.³ ............................................. F16D 1/02
[52] U.S. Cl. ................................... 403/337; 403/370
[58] Field of Search ...................... 403/335, 337, 370

[56] References Cited

U.S. PATENT DOCUMENTS

| | | | |
|---|---|---|---|
| 3,185,511 | 5/1965 | Wochner et al. | 403/337 |
| 4,089,613 | 5/1978 | Babbitt | 403/370 X |

FOREIGN PATENT DOCUMENTS

| | | | |
|---|---|---|---|
| 491134 | 8/1938 | United Kingdom | 403/377 |
| 446683 | 12/1974 | U.S.S.R. | 403/337 |

Primary Examiner—James Kee Chi
Attorney, Agent, or Firm—Burns, Doane, Swecker & Mathis

[57] ABSTRACT

A rigid coupling, suitable for turbomachines, includes friction flanges for transferring torque from one shaft to another, bolts for axially coupling the friction flanges together, and shearing bushings which encompass these bolts and which prevent relative radial motion between the flanges. One-half of the outer sidewall surface of each such shearing bushing is cylindrical, while the other half of the outer sidewall surface is conical. The cylindrical half of each shearing bushing is larger than the bore which accommodates it in one of the flanges, and is inserted by means of a shrink fit. The conical half of the shearing bushing mates with a bore in the other flange which has the same conical shape. Each shearing bushing may also have grooves cut into its frontal surfaces to form collars which flex during use. Because the shearing bushings undergo lateral deformations during assembly, the need for great precision concerning the tolerances for the diameters and relative positions of the bores accommodating the shearing bushings is avoided.

7 Claims, 2 Drawing Figures

RIGID COUPLING, ESPECIALLY FOR TURBOGENERATORS

BACKGROUND AND SUMMARY OF THE PRESENT INVENTION

The invention disclosed herein pertains generally to couplings for turbomachines, and more particularly to rigid couplings for turbogenerators.

Large torque transmitting couplings whose outer diameters must, for practical reasons, be limited in size are usually unable to transfer full nominal torques because of limits on the cross-sectional areas of the members, e.g., friction flanges, used for this purpose. In the event of a short-circuit or an electrical switching process within the power network an additional torque of much greater magnitude will be superimposed on this nominal torque either in the same or in the opposite direction of rotation. The torque component which cannot be transferred by frictional contact can be transferred by shearing bushings. Thus the friction members whose surfaces are used for the purpose of transmitting torques can then be used primarily to produce frictional contact and to absorb axial forces and bending stresses.

Large, interchangeable, torque-transmitting coupling halves, such as large flanges, require relatively large manufacturing tolerances for the placement of the bores which accommodate the shearing bushings; this is necessary in order to properly mate these coupling halves. The resulting loose fit of the shearing bushings will cause the coupling to slide or shift in the radial direction when frictional contact is lost. This will produce relative radial shifts, with respect to one another, of the driving and driven shaft axes of a turbomachine, for example, which will cause undue vibrations and a detrimental stress of shafts, bearings and the structural parts of the turbomachine.

In order to eliminate the undesirable effects mentioned above, various solutions have been proposed, but have been found to be impractical. Thus efforts are still being directed at narrowing the tolerances for the diameters and relative positions of the bores accommodating the shearing bushings in the two coupling flanges, while still making allowances for the problems arising during assembly. The aim of these efforts is the creation of a rigid coupling. Stated alternatively, the aim is the prevention of excessive relative motion between the coupling halves in the event that frictional contact between the adjacent frontal areas of the coupling flanges is lost. Such a loss of frictional contact may arise in the event of an overload.

A rigid coupling for turbomachines according to the present invention comprises coupling flanges for the shafts to be connected, bolts for connecting the coupling flanges, and shearing bushings which encompass these bolts and which engage the frontal areas of the two coupling flanges. A preferred embodiment of a rigid coupling according to the present invention includes shearing bushings which have the following two features: one half of the outer sidewall surface of each shearing bushing is both oversized relative to the respective bore provided for it in one of the coupling flanges and fitted in by shrinking; the second half of the outer sidewall surface of each shearing bushing, and its associated bore in the other coupling flange, has a conical shape. Upon assembly the two coupling flanges form an interference fit.

A primary object of the present invention is to provide a rigid coupling for turbomachinery, i.e., a coupling wherein excessive relative motion between the coupling halves is prevented in the event of an overload.

A further object of this invention is to provide a rigid coupling for turbomachinery which employs friction flanges for transmitting torques, bolts for connecting these flanges, and shearing bushings which encompass these bolts and which prevent relative motion between the flanges in the event of an overload.

Yet another object of this invention is to provide a rigid coupling employing shearing bushings wherein the tolerances for the diameters and relative positions of the bores accommodating the shearing bushings in the two coupling flanges are not as critical as has been the case up until the present time.

BRIEF DESCRIPTION OF THE DRAWINGS

A preferred embodiment of the present invention is described with reference to the accompanying drawings wherein like members bear like reference numerals and wherein.

DETAILED DESCRIPTION OF THE PREFERRED EMBODIMENT

Figure 1:
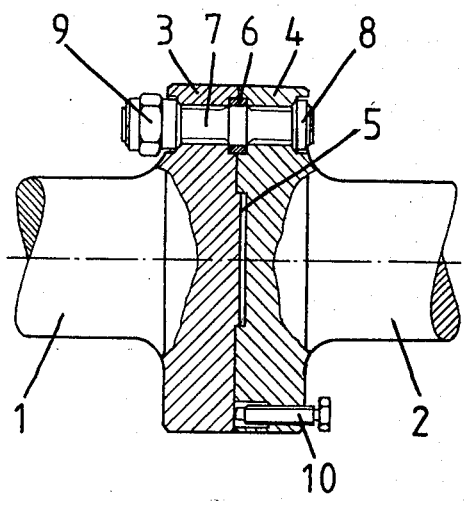
FIG. 1 is a cross-sectional view of a rigid coupling having a shearing bushing according to the present invention.

With reference to FIG. 1, a pair of shaft ends 1, 2, for example, of a turbogenerator unit, are to be connected so as to transmit rotational motion from one shaft to the other. Each of the shaft ends is provided with a coupling flange 3, 4 which forms a single piece with the respective shaft end. Alternatively, the flange and shaft end can also be made as separate pieces and connected together by keys or by some other arrangement. In order to align the axes of the flanges 3 and 4, the coupling flange 3 is provided with a central protrusion 5 which engages a corresponding recess in the coupling flange 4. At the rims of the coupling flanges there are located, at equal distances from each other, several hollow, cylindrical shearing bushings 6. Each bushing 6 is seated with approximately one-half of its length in a corresponding bore located in the adjoining frontal surface of each of the two coupling flanges. Threaded bolts 7 which pass loosely through the shearing bushings 6 and which have heads 8 seated in recesses of the coupling flange 4, provide an axial connection between the two coupling flanges. Nuts 9 threadably engage another end of each of the bolts.

In order to avoid excessive torsional stressing of the threaded bolts during tightening, the bolts are usually heated prior to installation and the nuts are tightened only slightly. Thus, after cooling, the bolts are for all practical purposes only under tensile stress. A lifting screw 10 can be screwed into a number of threaded bores provided in flange 4, if the two coupling flanges are to be separated from each other.

Figure 2:
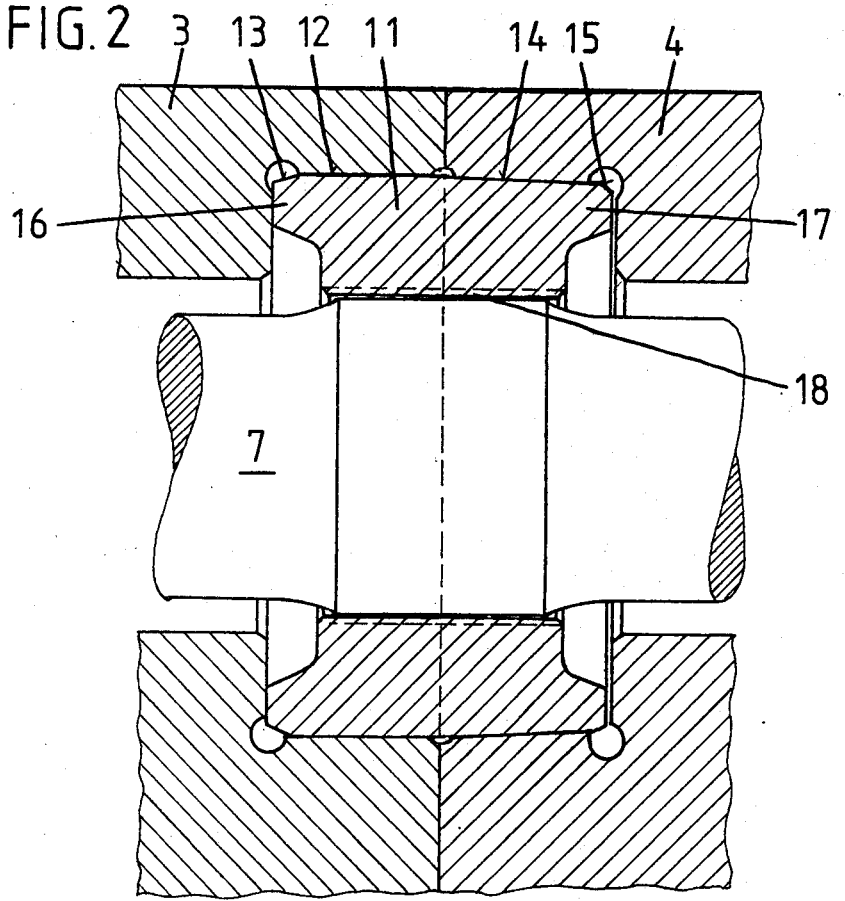
FIG. 2 is an enlarged, cross-sectional view of a portion of a rigid coupling within the region of a shearing bushing showing a preferred embodiment of the shearing bushing according to the present invention.

With reference now to FIG. 2, a preferred embodiment of a shearing bushing, according to the present invention, differs from the hollow, cylindrical shearing bushing of the embodiment in FIG. 1. A shearing bushing 11 is provided with deep grooves on its two front surfaces. A pair of collars 16 and 17, formed by the deep grooves, enable the shearing bushing to flex somewhat in the radial direction. Thus, when installed, the contact stress on the shearing bushing (from its outer edges toward its center) does not vary as greatly as in the case of the hollow, cylindrical shearing bushing shown in FIG. 1. To facilitate the insertion of the shearing bushing into the corresponding bores in the two coupling flanges 3 and 4 (arranged for accommodation of the bushing), the bushing is provided at its rims with bevels 13 and 15.

A jacket half 12 of the shearing bushing which is seated within the coupling flange 3 has a cylindrical outer surface whose diameter is greater than that of the corresponding bore (arranged to accommodate this jacket half) within the coupling flange 3. In order to be installed, the bushing needs to be cooled down to such a degree by using, for example, solid carbon dioxide or liquid nitrogen, that the bushing can be inserted into the cylindrical bore in the coupling flange 3. After returning to atmospheric temperature this half of the shearing bushing will then be seated solidly in the bore as a result of the shrinkage fit.

A second jacket half 14 of the shearing bushing 11 is given a slightly conical shape, preferably a gentle taper of about 1:200, but in any event a conical angle which is substantially smaller than the friction angle. That is, the conical angle is necessarily less than the maximum conical angle at which necessary friction between the bushing and flange 4 is provided. In FIG. 2, the size of this conical angle is exaggerated.

The bore in the coupling flange 4, arranged to accommodate the conical jacket half 14, has the same conical angle as the jacket half 14 so that the two conical surfaces will mate without play when the jacket half 14 is longitudinally pressed into the conical bore. The largest diameters of the two conical surfaces are so dimensioned that when the two coupling flanges 3 and 4 are bolted together with bolts 7, the frontal surfaces of the two coupling flanges are brought into flush contact with each other. This flush contact results in sufficient friction between the two coupling flanges to transfer the existing torque, at least under normal conditions. The conical jacket halves 14 of the shearing bushings 11 are seated under great initial radial stress and are self-locking in the conical bores of the coupling flange 4, thereby eliminating any play in the radial direction. The positional tolerances of the bores in the coupling flange 4 relative to the bores in the coupling flange 3, unavoidable in the case of interchangeable manufacture, are compensated here by a lateral deformation, i.e., a deformation of the cross section, of the shearing bushings. Since the stems of the bolts 7 are seated loosely in the bores 18 of the shearing bushings, this lateral deformation is not hindered by the bolting together of the coupling flanges.

The bores 18 in the shearing bushings are threaded to permit the insertion of screws into these threaded bores for the purpose of removing the shearing bushings. For example, a shearing bushing, its cylindrical jacket half 12 seated in the coupling flange 3, can be removed, after the flange 4 has been unbolted and separated from flange 3, by placing a tubular support, such as a pipe fitting, onto the frontal surface of flange 3. This pipe fitting must be such that its inner diameter is greater than the diameter of the conical jacket half 14 of the shearing bushing. A screw is then screwed into the threaded bore 18, with the head of the screw supported at said pipe fitting, and the screw with the attached shearing bushing is then pulled out. It is also possible to insert a screw through the other end of the bore and pull out the shearing bushing by pulling on a nut placed on the end of the screw and supported by said pipe fitting. If necessary, and in order to facilitate its withdrawal, the size of the shearing bushing can be reduced by cooling it down.

Modification and variations of the present invention are possible in light of the above teachings. It is therefore to be understood that within the scope of the appended claims the invention may be practiced otherwise than as specifically described, and that all the matter contained in the above description and shown in the accompanying drawings shall be considered as illustrative and not in a limiting sense.

What is claimed is:

1. A rigid coupling for joining together first and second shaft ends, especially in a turbomachine, comprising:
   a first flange fixed with respect to the first shaft end;
   a second flange fixed with respect to the second shaft end;
   at least one annular shearing bushing arranged between said first and second flanges, the at least one shearing bushing having a first portion received within a bore of the first flange and a second portion received within a bore of the second flange;
   said first portion including a generally cylindrical outer wall surface having a diameter which is greater than the diameter of the bore in the first flange, and which first portion is inserted into said bore by means of a shrink fit;
   said second portion including a generally conical outer wall surface and said bore in the second flange having a conical shape which substantially corresponds to the conical shape of the outer wall surface of said second portion; and
   means for axially urging the first and second shaft ends together.

2. The rigid coupling of claim 1 further comprising: a plurality of annular shearing bushings arranged circumferentially about said first and second flanges, each of the annular shearing bushings being arranged between said first and second flanges, with each annular shearing bushing having a first portion received within a bore of the first flange and a second portion received within a bore of the second flange.

3. The rigid coupling of claim 1 wherein the means for axially urging the first and second shaft ends together includes at least one threaded bolt.

4. The rigid coupling of claim 3 wherein said at least one threaded bolt passes through the at least one annular shearing bushing.

5. The rigid coupling of claim 1 wherein the first and second flanges are formed integrally with the corresponding first and second shaft ends.

6. The rigid coupling of claim 1 wherein the conical outer wall surface of the shearing bushing has a taper of about 1:200.

7. The rigid coupling of claim 1 wherein the at least one shearing bushing has first and second deep grooves provided at front surfaces of the bushing, the grooves defining first and second collars for the shearing bushing.

* * * * *